United States Patent [19]

Sinz

[11] 3,875,575

[45] Apr. 1, 1975

[54] CHART CARRIER AND CHART FOR RECORDING MULTIPLE OPERATIONS AND PARTICULARLY FOR RECORDING A PAIR OF INTERRELATED OPERATIONS

[75] Inventor: Karl Sinz, Ditzingen, Germany

[73] Assignee: Moto Meter GmbH, Leonberg Wurttemberg, Germany

[22] Filed: Mar. 28, 1974

[21] Appl. No.: 455,903

[30] Foreign Application Priority Data

Mar. 30, 1973 Germany ............................ 2315974

[52] U.S. Cl. .................................... 346/44, 346/137

[51] Int. Cl. ........................ G07c 5/12, G01d 15/34

[58] Field of Search ......... 346/18, 44, 45, 121, 122, 346/123, 124, 137

[56] References Cited

UNITED STATES PATENTS 1,483,039 2/1924 Bickel ............................ 346/137 X 3,761,948 9/1973 Voegtlin et al. ...................... 346/44

*Primary Examiner*—Joseph W. Hartary

*Attorney, Agent, or Firm*—Michael S. Striker

[57] ABSTRACT

A chart carrier has a pair of record charts thereon in mutually registered and oppositely facing positions. A pair of record producers is provided, one of said producers facing the other. Each record producer has means for recording on one of said charts, concurrently with the operation of the other record producer on the other chart, but in mirror-reversed condition relative to the other record producer. The charts of said pair have identical constructions and imprints, said imprints providing a pair of mutually registered, mirror-reversed scales on each chart.

6 Claims, 3 Drawing Figures

CHART CARRIER AND CHART FOR RECORDING MULTIPLE OPERATIONS AND PARTICULARLY FOR RECORDING A PAIR OF INTERRELATED OPERATIONS

BACKGROUND OF THE INVENTION

Multiple record producers are known, particularly for recording interrelated operative conditions of a device, such as a vehicle. In one typical case the vehicle has two potential drivers, one of them driving the vehicle while the other rests. It is known in such cases to simultaneously record the interrelated operations, for example, the active operation of one driver and concurrently therewith the rest position or inactive position of the second driver. It has been usual for such purposes to arrange a pair of circular charts coaxially with one another, with record sides facing in opposite directions, and for example to record on one of these charts the active operating times and resting times of one driver, and on the other chart, the corresponding resting and active operating times of the other driver.

Heretofore, it was necessary in recorders of this type to provide two different charts, one having a scale which was a mirror-inverted image of the scale of the other chart. Special care was then necessary for one driver to put his particular chart on the chart carrier, with its record side facing for example upwardly, and for the other driver to provide the record carrier with the other particular type of chart, facing downwardly. This use of two different types of charts made it necessary to take special precaution, whereby each driver puts the type of chart proper for his operation onto the carrier. The necessity of special precaution introduced extra complexities, and resulting costs, into the operation. It also led to relatively frequent errors and confusions, in the use and evaluation of the charts.

SUMMARY OF THE INVENTION

It is an object of the invention to eliminate such extra complexities, costs, errors and confusions.

It is another object to provide a new type of chart which allows elimination of such extra complexities, costs, errors and confusions.

It is a further object to provide a new combination of chart recorders and charts to eliminate such extra complexities, costs, errors and confusions.

For these purposes the new arrangement uses a single type of chart for both drivers, or more generally for the several operating conditions to be recorded. The new chart has at least one pair of scales on its single record surface and each scale of the pair has its own individual and distinctive position relative to its reference base. For example, each scale of the pair has its own individual and distinctive diameter, in the case of a circular chart, and has annularly disposed graduations in positions mirror-reversed with respect to the graduations of the other scale. These new charts, and the new apparatus for operating the same, can cooperate with conventional record producing means. A record pen recording the operations of a first driver produces a first record, for this first driver on the first chart, while a similar pen produces a second record for the second driver on the second chart. The two records are produced in angularly opposite parts of annular blank areas, between the two scales on the two charts, and in mutually mirror-reversed conditions. Independent operation records for the two drivers can thus be produced simultaneously but independently.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 2:
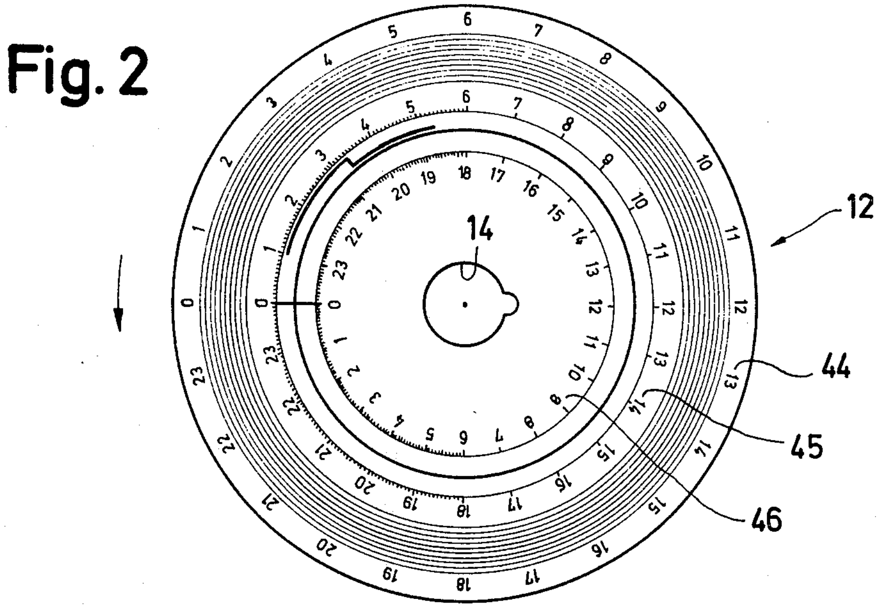
FIGS. 2 and 3 show a pair of identical record charts, according to the invention, each chart being shown with its own graph, scribed between its mutually mirror-reversed time scales thereon.
Figure 1:
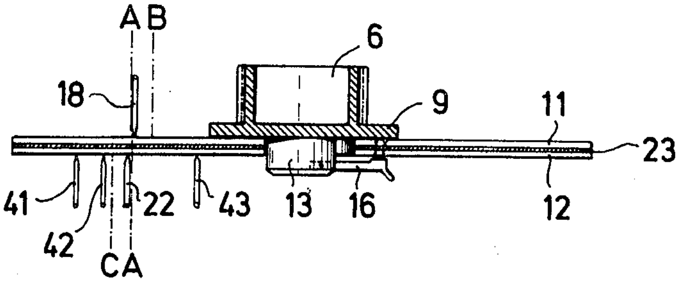
FIG. 1 is a central vertical section through recording apparatus according to the invention, with a pair of the new record charts thereon.
Figure 3:
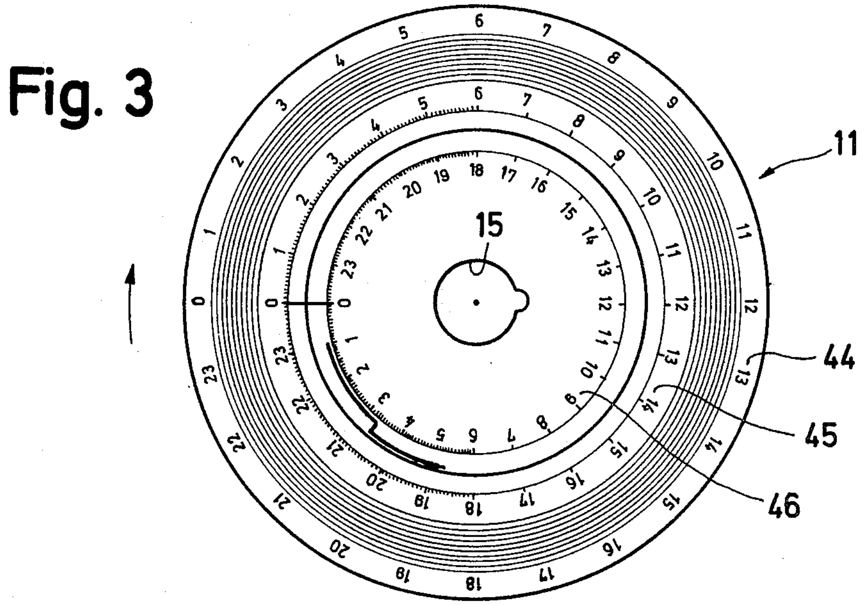

As shown in FIG. 1 the new recorder has a single chart carrier 6 movable for recording and for example rotatable by well-known clockwork (not shown). The carrier 6 includes a flat plate 9 for mounting thereon a pair of record charts or sheets, or particularly record discs 11 and 12, these sheets lying parallel to plate 9 and having a stiff disc 23 disposed between them. Their record receiving surfaces face in mutually opposite direction, shown respectively as upwardly and downwardly facing. As shown in FIGS. 2 and 3, the two charts 11 and 12 have identically imprinted charting or record receiving surfaces thereon, and also have identically shaped or punched out mounting arrangements for mounting these charts on a single mounting pin 13 disposed centrally of plate 9. For such mounting, the bottom-mounted chart 12 has a central mounting hole 14 of circular shape with a single radial extension facing toward imprinted numerals 12, thereby providing registration of the chart relative to carrier 6 with the aid of a single radially extending key, as indicated in FIG. 1. An identical mounting hole 15 has an identically shaped and identically oriented, radial extension, provided on the top-mounted chart 11.

Each chart 11 and 12 has, in an inner region of its record surface, a circular scale 45 imprinted with scale graduation numerals, progressing clockwise from 0 to 23; an innermost scale 46 imprinted with the same numerals, progressing counterclockwise from 0 to 23; and between these two scales, an annular and generally blank record area, shown as divided into two concentric parts, by a circle. When the two charts are mounted on the carrier as noted above, the angular locations of scale graduations of innermost scale 46, on bottom-mounted chart 11, are registered to coincide with angular locations of surrounding scale 45 on the top-mounted chart 12. For example, when the charts 11, 12 are so mounted, the numeral 6 of the innermost scale 46 of chart 11 is registered with numeral 6 of the surrounding scale 45 of chart 12.

The two charts are held against plate 9 by holder means shown as a lever 16, pivoted to center pin 13 (FIG. 1). As further shown, recording pen 18 is provided for scribing a record on chart 11, while recording pen 22, facing in the opposite direction, is provided for scribing a corresponding record on chart 12. These two pens 18 and 22 are movable respectively through radial distances AB and AC corresponding to concentric angular portions of the blank record area between scales 45 and 46 on both charts.

The apparatus is shown as including additional recording pens 41, 42 and 43 for scribing additional records on the lower chart 12. It will be understood that the lower pens 22, 41, 42, 43, as well as the upper pen 18, can be removed from contact with the charts, or at least this can be done for said lower pens, in order to allow removal and interchange of the charts 11, 12 on the recorder. The mechanism for such removal of the recording pen system is not illustrated herein, being well known to persons skilled in the art.

In the operation of the apparatus, the several pens 18, 22, 41, 42 and 43 indicate measuring values. Particularly they indicate changes of such values by moving radially, and for example, the upper pen 18 is shown as having produced, in the plan view of FIG. 3, a graph in the angular blank area between scales 45, 46 beginning adjacent position 1 on innermost scale 46, ending between 5 and 6 on this scale, and showing an outward excursion or step in the vicinity of position 3.2 on this scale. As shown in the bottom view of FIG. 2, the lower pen 22 has produced, in the corresponding angular, blank area, a graph which, by contrast, shows an inward excursion at substantially the same angular position.

By well known means in the recorder (not shown) the upper and lower pens 18, 22 can perform their respective, radial excursions in response to working conditions of the first and second vehicle drivers, respectively, while carrier 6 rotates the charts relative to the pens. Upper pen 18 thus records, on upper chart 11, the work of the first vehicle driver, by the graph on this chart 11, adjacent inner scale 46, while the work of the second driver is shown by the graph adjacent surrounding scale 45 on lower record 12. At the same time the lower pens 41, 42, 43 of the recording system may record, respectively, the forward velocity of the vehicle; vibrations of the vehicle; and the distance covered by the vehicle.

In a typical operation of the apparatus, indicated by the scribed curve on lower chart 12 (FIG. 2), one driver of the vehicle was engaged in active driving from 1 o'clock to 3.2 o'clock, then changed to rest as shown by the inward step, and thereupon rested till shortly after 5 o'clock. During the same time, as shown on upper chart 11 adjacent scale 46 (FIG. 3), the other driver had a rest period from 1 to about 3.2 o'clock, then changed to active driving as shown by the outward step, and had an active driving period from then to shortly after 5 o'clock. In the indicated sample records, the transitions took place at substantially the same time (3.2 o'clock); however, it will be understood that other situations may be encountered and corresponding curves will then be provided by the new apparatus and on the new charts.

The new charts for first and second drivers, as mentioned, are identically constructed and identically imprinted. When the new recorder has recorded the respective graphs, the two charts differ, as one chart has its graph scribed adjacent innermost scale 46, as shown in FIG. 3, and while the other chart has its graph scribed adjacent the surrounding scale 45, which is printed as a mirror image of the first mentioned scale. For general orientation, each chart is shown as having also an outermost time scale 44, surrounding the pair of scales 45, 46 for the operation of outer recording pens 41, 42 in FIG. 1.

By means of this new arrangement of the charts, and of the apparatus containing the charts in the aforementioned relationship and arrangement, the invention achieves the advantage that only a single type of chart is needed for the two drivers and that as a result, no mistake is possible incident to the insertion of the several charts in the recorder. In other words, it is no longer necessary to make sure that a chart of one particular type is inserted in the recorder facing upwardly and that another particular type of chart is inserted in position facing downwardly.

It will be understood that the record surfaces, particularly those between inner and outer scales 46, 45, can be constructed in any desired way, for example, in such a way that the graphs are produced in response to pressure of pens 18, 22 against the charts. Also, instead of moving, for example, the upper pen 18 through radial region AB with possible radial excursions, it is possible to vary the pressure exerted by a pen 18 or 22, against the charts 11, 12 and thereby to vary the width of the graph. Finally, it is possible and is sometimes preferred, to provide means (not shown) whereby an interlock is effected between pens 18 and 22, so that, for example, when one driver has begun to record active driving by his pen 18, recording of active driving is no longer possible for the opposite pen 22, and for the driver whose operation is recorded thereby.

It will be understood that each of the elements described above, or two or more together, may also find a useful application in other types of chart carriers and charts differing from the types described above.

While the invention has been illustrated and described as embodied in chart carriers and charts, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for recording multiple operations comprising: a single carrier for holding and moving record charts; at least one pair of such charts, held on said carrier; and at least one pair of record producers, one facing the other and each having means for recording on one of said charts, concurrently with but in mirror-reversed condition relative to the other record producer; each chart of said pair having at least one pair of scales with mirror-reversed scale graduations thereon.

2. Apparatus as defined in claim 1, wherein said carrier is of the rotary type and said charts and scales are generally circular.

3. Apparatus as defined in claim 1, wherein said carrier has a single shaft for rotating both charts of said pair.

4. Apparatus as defined in claim 3, wherein said several record producers are movable in accordance with several conditions of operation of a single device, such as driving and rest operations of several drivers on a single vehicle.

5. A set of charts for concurrently recording thereon a plurality of operations, each of said charts having substantially identical construction and surface imprint and said imprint on each chart including at least one pair of scales, said scales having individual distinctive positions relative to their relative bases, and having graduations in positions mirror-reversed with respect to one another.

6. A set of charts as defined in claim 5, wherein said scales of said pair are circular and are disposed at different radial distances from the center of the chart, leaving therebetween an annular, blank area for a pair of graphs, to be recorded thereon.

* * * * *